A. Pudigon,
Sap Spout,
N° 77,319. Patented Apr. 28, 1868.
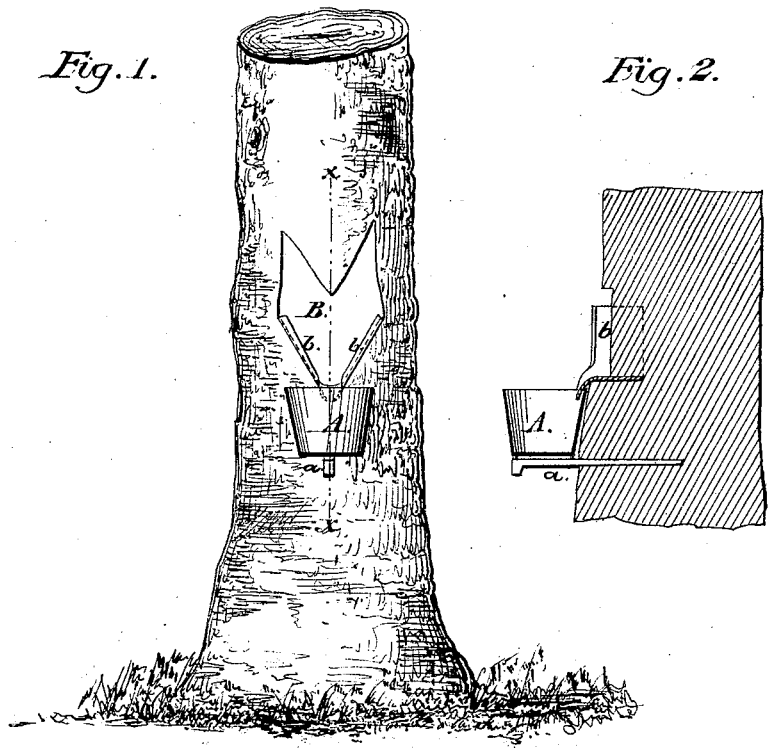

United States Patent Office.

A. PUDIGON, OF CHARLESTON, SOUTH CAROLINA.

Letters Patent No. 77,319, dated April 28, 1868.

IMPROVEMENT IN GATHERING TURPENTINE.

*The Schedule referred to in these Letters Patent and making part of the same.*

TO ALL WHOM IT MAY CONCERN:

Be it known that I, A. PUDIGON, of Charleston, in the district of Charleston, and State of South Carolina, have invented new and useful Improvements in Gathering Turpentine; and I do hereby declare that the following is a full, clear, and exact description thereof, which will enable those skilled in the art to make and use the same, reference being had to the accompanying drawings, forming part of this specification, in which—

Figure 1 is a perspective view of a pine tree, with my improvements in place.

Figure 2 is a sectional view, through the line $x\,x$, fig. 1, of the improvements when in place.

Similar letters of reference indicate corresponding parts.

This invention relates more particularly to the gathering of crude turpentine from the pine tree, but may be employed for the collection of all resinous gums of a kindred character which exude from wounds in trees.

The invention consists of a bucket or vessel, A, which is held in contact with the tree at the lower end of the sheet metal $b\,b$, and a spike, $a$, as shown.

The gutter is simply a V-shaped strip of metal, with its front edges turned up to direct the turpentine down to the angle, and thence on to the jar or bucket A, and its back edges sharp to drive into the sap-wood o the tree. The tree is then (or it may be done before) scarified through the cortical system or inner bark, which exposes the sap-wood, to exude the sap or turpentine, as shown at B.

Heretofore it has been the practice, in gathering turpentine, to cut cavities or boxes in the sap-wood to the depth of five or six inches, at the bottom of the blaze or scarification, and dip out the turpentine collecting therein with iron dippers. This method is objectionable for several reasons.

Several of such boxes were required around the tree, which lessened the vitality of the latter, which diminished the formation of sap, and caused the early decay of the tree.

Such trees were always liable to be blown down in high winds.

The loss of turpentine from the leaking of the boxes, when improperly cut, and from the evaporation and drying of the turpentine, when, from year to year, or as the season advanced, the scarification was extended, thus increasing the distance between the point of exudation and the box, constitutes an objectionable feature of that mode of collecting the turpentine.

Again, the impossibility of dipping out the whole of the turpentine with dippers, occasioned some loss of the raw material.

The labor of cutting the boxes, which was performed with a heavy axe, was considerable, and required some skill to cut them properly.

The above objections I obviate by employing the V-shaped sheet-metal gutter above set forth, which is portable, cheap, and injures the tree to less extent than the old method above described.

I claim as new, and desire to secure by Letters Patent—

The V-shaped sheet-metal gutter $b$, substantially as shown and described.

A. PUDIGON.

Witnesses:
H. THORNTON AXSON,
P. FLYNN.